July 24, 1928.  
F. B. LAMB  
1,678,149  
ENDLESS TRACK FOR VEHICLES  
Filed Feb. 1, 1924  
4 Sheets-Sheet 1
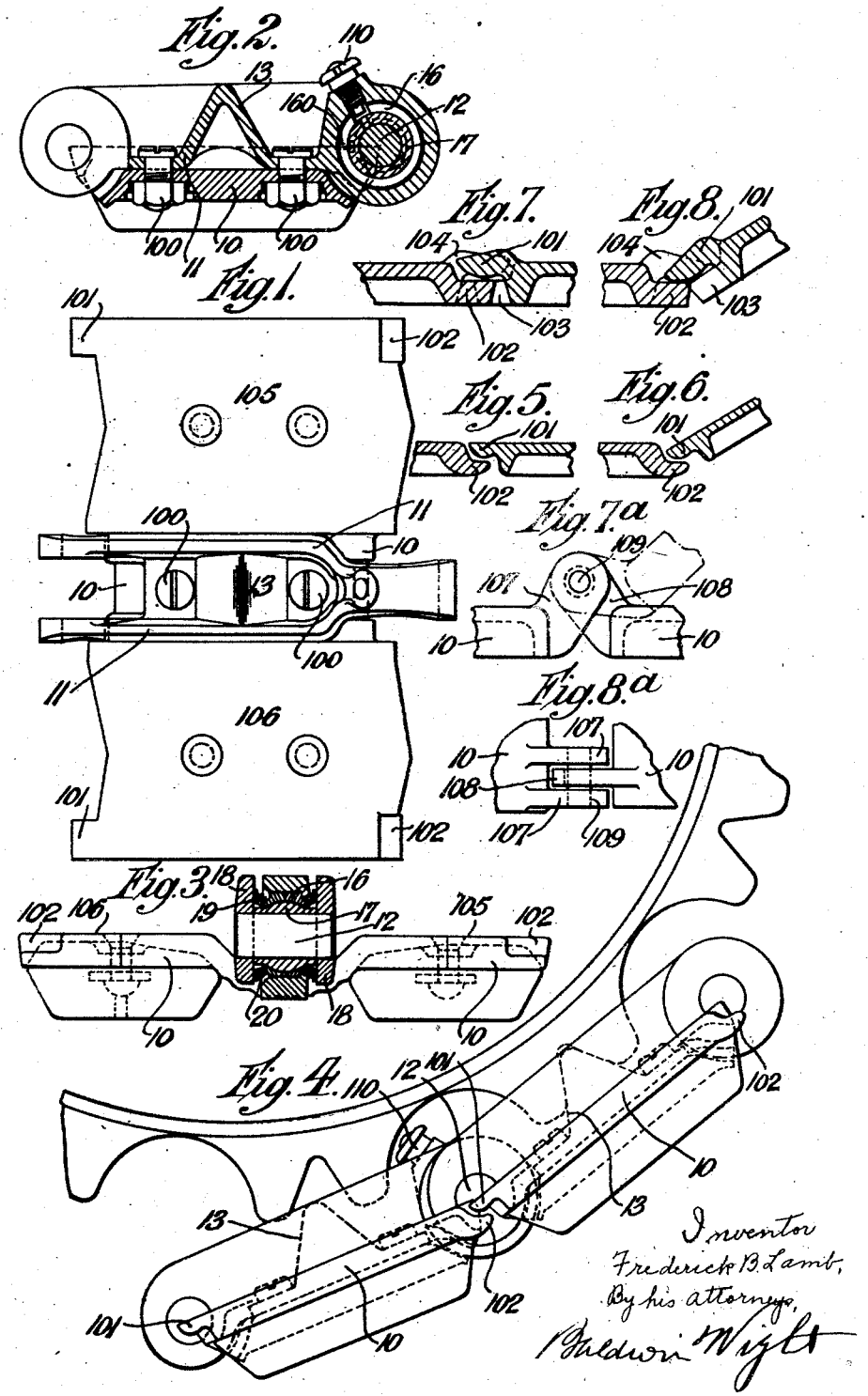

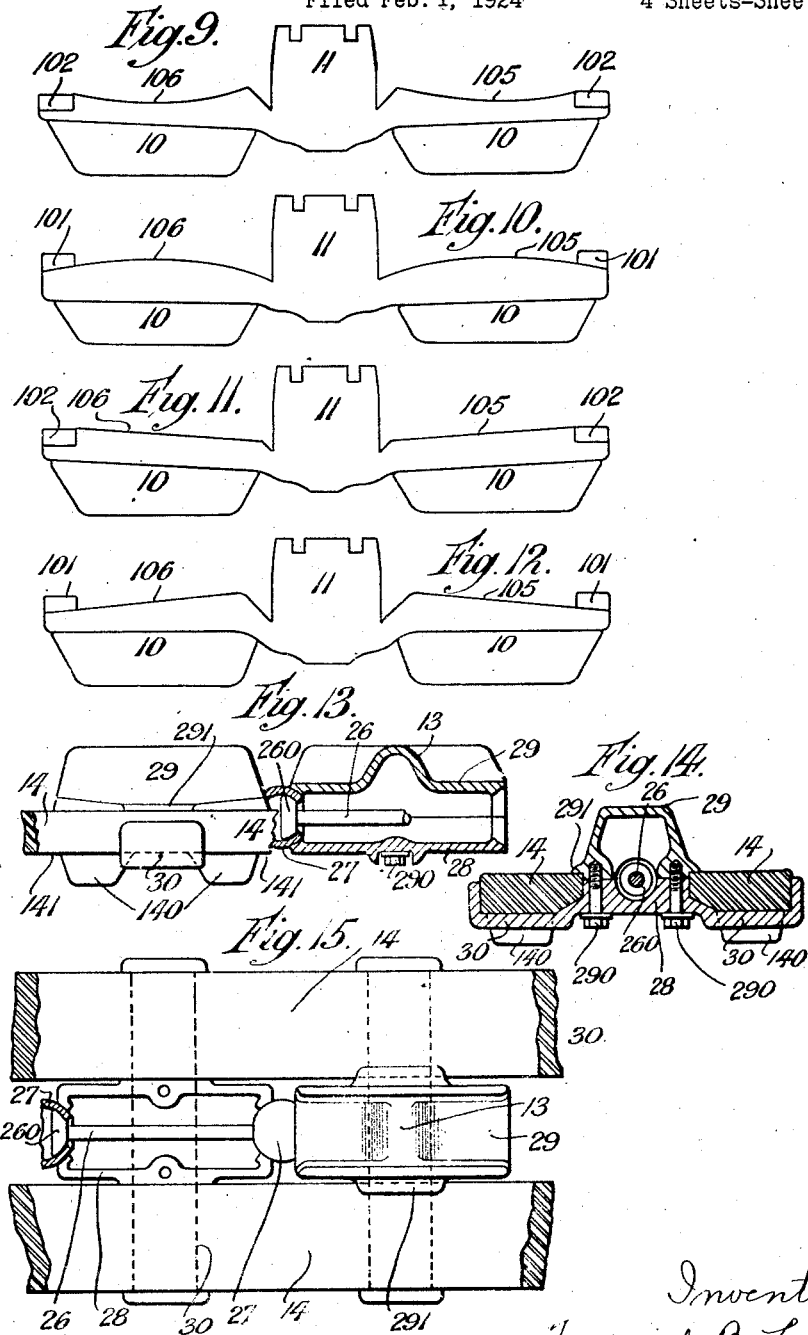

July 24, 1928. 1,678,149
F. B. LAMB
ENDLESS TRACK FOR VEHICLES
Filed Feb. 1, 1924 4 Sheets-Sheet 3
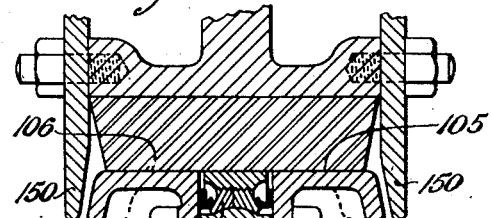
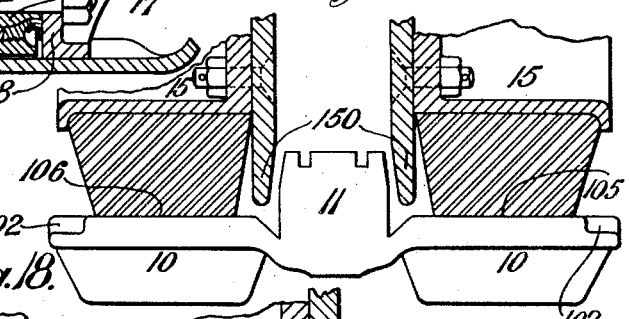
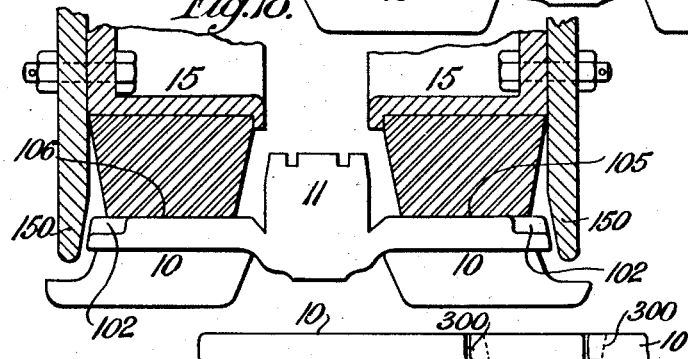
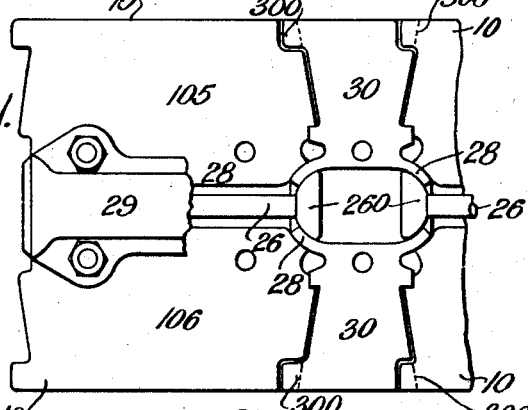
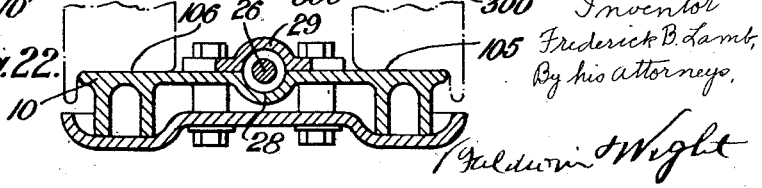
Inventor
Frederick B. Lamb,
By his attorneys, July 24, 1928.
F. B. LAMB
1,678,149
ENDLESS TRACK FOR VEHICLES
Filed Feb. 1, 1924
4 Sheets-Sheet 4
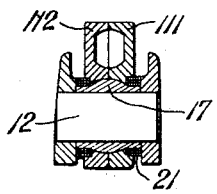
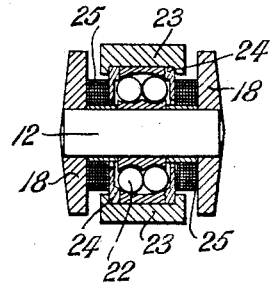
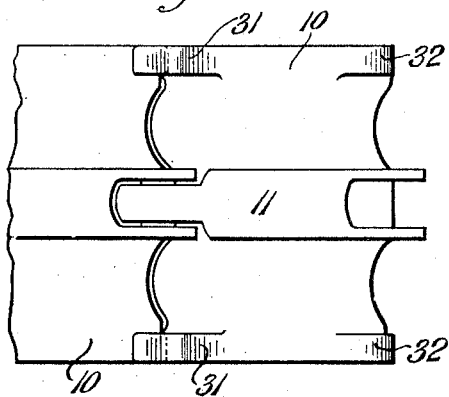
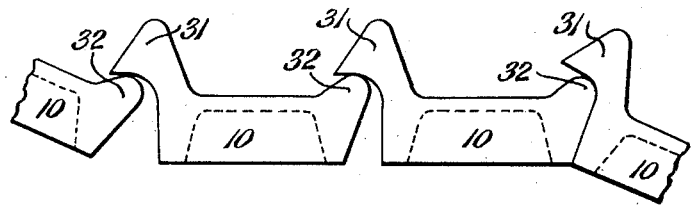
Inventor
Frederick B. Lamb,
By his attorneys,
Baldwin Wight Patented July 24, 1928.

1,678,149

UNITED STATES PATENT OFFICE.

FREDERICK BRIDDON LAMB, OF LONDON, ENGLAND, ASSIGNOR TO ROADLESS TRACTION, LIMITED, OF HOUNSLOW, MIDDLESEX, ENGLAND.

ENDLESS TRACK FOR VEHICLES.

Application filed February 1, 1924, Serial No. 690,057, and in Great Britain February 5, 1923.

This invention relates to endless tracks for whole or part track vehicles in which the track consists of a plurality of track shoes having surfaces on each side of their central longitudinal axis adapted to form paths upon which the rollers supporting the weight of the vehicle run and are secured together by links forming central connections which permit of universal movement or movement about two axes, or the track shoes may be combined with bands or belts to form paths.

The links and shoes may be formed separately and jointed together or the shoes and links may be formed in one piece.

The accompanying drawings illustrate tracks made in accordance with this invention.

Figure 1 is a plan and Figure 2 a central longitudinal section of a shoe. Figure 3 is an end view of a shoe showing the link in section. Figure 4 is a side view of a track passing around the sprocket wheel. Figures 5 and 6, 7 and 8, and 7ª and 8ª show three arrangements of lugs for limiting the movement of the shoes. Figures 9, 10, 11 and 12 show diagrammatically different forms of the surfaces on each side of the track shoes which form paths for the rollers. Figure 13 is a side elevation partly in section, Figure 14 is a transverse section and Figure 15 a plan of an alternative form of link which at the same time shows the form of band forming a path for the rollers. Figures 16, 17 and 18 are sections of the weight carrying rollers running on the track and provided with flanges. Figure 19 is a section of one form of link. Figure 20 is an alternative form of link having self-alining ball bearings. Figure 21 is a plan and Figure 22 a transverse section showing tracks having shoes of smaller size intermediate the other shoes. Figure 23 is a plan and Figure 24 a side elevation of a track in which the driving teeth act as stops limiting the motion of the shoes.

Referring more especially to Figures 1, 2, 3 and 4, 10 are track shoes connected by bolts 100 to links 11, the two parts of which are connected together by pins 12, the joints of the links being lubricated through passages closed by screws 110. The teeth 13 by which the track is driven are made in one piece with the link. The turning movement of the shoes 10 is limited by lugs 101 on one link engaging with lugs 102 on the adjacent link as shown in Figures 5 and 6. Alternatively there may be two lugs 101 and 103 on one link and two lugs 102 and 104 on the adjacent link as shown in Figures 7 and 8.

In Figures 7ª and 8ª one shoe 10 has two lugs 107, 107 and the other shoe 10 has a lug 108 which is inserted between them. Holes are bored in the lugs 108 which are of greater diameter than the diameter of a pin 109, the movement of the shoes 10 being thereby limited by the pin held in the lugs 107.

The parts 105 and 106 of the shoes 10 on each side of the links form paths for the weight carrying wheels and the various shapes which these may take are shown in Figures 9, 10, 11 and 12.

The paths upon which the weight carrying rollers run may consist of belts 14 as is more particularly shown in Figures 13, 14 and 15. On the outer surface of these belts are pads 140 which form treads as hereinafter described.

In order to control the lateral movement of the weight carrying rollers 15 they are provided with two side flanges 150 which engage with the edges of the surfaces 105 and 106 as shown in Figure 16, in which case one series of rollers 15 is employed and in which the surfaces 105 and 106 are raised above the level of the joint pin 12.

In Figures 17 and 18, two series of rollers 15 are employed. In Figure 17 the flanges 150 are on the inside of the rollers and in Figure 18 on the outside of the rollers.

The links connecting the shoes may be of different forms. The links shown in Figures 3 and 16 comprise a split housing 16 adapted to receive a bush 17 in which is a hole to receive the pin 12 which passes through the jaws 18 of the adjacent link. The outer surface of the bush 17 is partly spherical as shown, and the inner surface of the housing 16 is spherical and bears upon the spherical portion of the bush 17. The housing is sealed by leather rings 19 secured in position by spring rings 20, as seen in Figure 3.

The bush 16 may be prevented from turning by a pin 160 as shown in Figure 2.

Another form of joint is shown in Figure 19, in which the link 11 is formed in two pieces 111 and 112 and on each piece is a portion of a spherical surface which bears upon the spherical portion of the bush 17. The joint is sealed by packing rings 21.

Alternatively the bush and housing may be replaced by a ball bearing 22 as shown in Figure 20. The ball bearings 22 are held between the jaws 18 and the male end 23 of the link which has turned-over flanges to retain the ring 24 of the bearing. The joint is sealed by rings 25.

Another construction is shown in Figures 13, 14 and 15 in which case the connection consists of a bar 26 having at its ends spherical surfaces 260. The spherical surfaces at the ends of adjacent bars are connected together by a housing 27 whose inner surface is spherical. Sleeves are mounted upon the outer surface of the housings 27, the sleeves being formed in two parts 28 and 29 connected together by studs 290 and the parts 28 are connected by means of arms 30 extending on each side of the longitudinal side of the track, which arms fit into slots in the belt 14 and are retained in them by projections 291 on the part 29. Intermediate the slots in the belt above mentioned are other slots 141 which allow of the bending of the belt about the centre of the joint.

Referring to Figures 21 and 22, the lower part 28 of the housing may be made integral with a shoe 30 intermediate and smaller than the other shoes; the shoe 30 has lugs 300 which engage with lugs on the other shoes.

In Figures 23 and 24 driving teeth 31 are formed at the edges of the shoes 10, which driving teeth also form lugs engaging with other lugs 32 to limit the motion of the shoes. In this case any suitable form of connection between the links may be employed such as that shown in Figures 3, 16, 19 or 20.

What I claim is:—

1. In endless tracks which comprise a plurality of track shoes having surfaces on each side of the central longitudinal axis, a central connection between adjacent shoes which permits universal movement, and co-acting means carried by the shoes at their outer edges for limiting the movement thereof about their central longitudinal axes.

2. A construction as recited in claim 1 in which the means for limiting the movement of the shoes comprises coacting lugs formed on the track shoes.

3. In endless tracks which comprise a plurality of track shoes having surfaces on each side of their central longitudinal axis, a central connection between adjacent shoes which permits movement about two axes, and means carried by the shoes at their outer edges for limiting the movement thereof about their central longitudinal axes which means consists of co-acting lugs that also serve as teeth for engagement with a driving sprocket.

In testimony that I claim the foregoing as my invention I have signed my name this 7th day of January, 1924.

FREDERICK BRIDDON LAMB.